United States Patent
Tetenbaum et al.

[15] 3,692,908
[45] Sept. 19, 1972

[54] METHOD OF COMBATING NEMATODES EMPLOYING N,N'-DISUBSTITUTED-2,5-DIKETOPIPERAZINES

[72] Inventors: Marvin T. Tetenbaum; Edward R. Degginger, both of Convent, N.J.

[73] Assignee: Allied Chemical Corporation, New York, N.Y.

[22] Filed: March 25, 1970

[21] Appl. No.: 22,667

[52] U.S. Cl.................................................424/250
[51] Int. Cl...............................................A01n 9/22
[58] Field of Search.....................................424/250

[56] References Cited

UNITED STATES PATENTS 3,142,530   7/1964   Kokorudz..............424/250 X

OTHER PUBLICATIONS

Chemical Abstracts 49:11922f (1955)
Goodman, Gilman – " The Pharmacological Basis of Therapeutics" pg. 1022 (1965)

*Primary Examiner*—Albert T. Meyers
*Assistant Examiner*—Leonard Schenkman
*Attorney*—Arthur J. Plantamura and Stanley M. Teigland

[57] ABSTRACT

Materials, such as plants, are protected from attack by fungi and nematodes by applying to the material an N,N'-disubstituted-2,5-diketopiperazine wherein the substituents are halogen, halometallo, or acyloxymetallo.

2 Claims, No Drawings

METHOD OF COMBATING NEMATODES EMPLOYING N,N'-DISUBSTITUTED-2,5-DIKETOPIPERAZINES

This invention relates to a method of combating fungi and nematodes employing N,N'-disubstituted-2,5-diketo-piperazines.

In accordance with this invention, materials, such as plants, can be protected from attack by fungi and nematodes by applying to the material an effective amount of an N,N'-disubstituted-2,5-diketopiperazine wherein the substituents attached to the nitrogen atoms are the same and are selected from the group consisting of fluorine, chlorine, bromine, iodine, and radicals having the formula —MY wherein M is a metal selected from the group consisting of zinc, cadmium, mercury, copper and manganese, and Y is fluorine, chlorine, bromine, iodine or an acyloxy radical having the formula —OCOR wherein R is chlorine, phenyl, lower alkyl substituted phenyl, or an alkyl or halogenated alkyl radical having from one to 18 carbon atoms. As used herein, the term N,N'-disubstituted 2,5-diketopiperazine includes such compounds bearing substituents in the 3 and 6 positions which do not adversely affect the fungicidal or nematocidal activity of the compound, such as phenyl and lower alkyl groups.

In the preferred embodiments of this invention, the substituents attached to the nitrogen atoms are selected from the group consisting of chlorine, bromine, and radicals having the formula —HgY wherein Y is chlorine, bromine or an acyloxy radical having the formula —OCOR wherein R is an alkyl or halogenated alkyl radical having from 1 to 12, preferably one to six, carbon atoms. Particularly good results are obtained when R is trifluoromethyl.

The N,N-disubstituted-2,5-diketopiperazine is applied to the material to be protected in the form of a dust or spray comprising the diketopiperazine and a suitable carrier or diluent. The dust or spray is applied in accordance with conventional methods to produce a fine dispersion of the diketopiperazine on the material. Suitable solid diluents include talcum, diatomaceous earth, wood flour, silica gel and the like. Where the diluent is a solid, the composition preferably contains 0.1 to 1.0 weight percent of the diketopiperazine. Suitable liquid diluents include water, acetone, petroleum distillates and the like. Preferably, the composition is an aqueous dispersion or emulsion of the diketopiperazine in a water-miscible organic solvent, such as acetone. Where the diluent is a liquid, the composition preferably contains from 0.001 to 1.0 weight percent of the diketopiperazine. Other adjuvants, including conventional wetting, dispersing and emulsifying agents, can also be added to the formulation.

The diketopiperazines are prepared in accordance with methods known in the art. N,N'-dihalo-2,5-diketopiperazines are prepared by reacting a 2,5-diketopiperazine with elemental halogen. The reaction is preferably carried out in an aqueous medium at a temperature not exceeding about 30°C. Particularly good results are obtained using chlorine or bromine as the halogen. This method of preparing N,N'-dihalo-2,5-diketopiperazines is exemplified in U.S. Pat. No. 3,142,530.

N,N'-diacyloxymetallo-2,5-diketopiperazines are prepared by reacting a 2,5-diketopiperazine with a metal salt having the formula $M(OCOR)_2$ wherein M and R are as defined herein. The reaction is preferably carried out in aqueous solution which has been made slightly acidic in order to prevent precipitation of metal oxide or basic metal salts. This method of preparing N,N'-diacyloxymetallo-2,5-diketopiperazines is exemplified in the Journal of Organic Chemistry, Vol. 2, 1937, pp. 403–410.

N,N'-dihalometallo-2,5-diketopiperazines are prepared by treating an N,N'-diacyloxymetallo-2,5-diketopiperazine, such as N,N'-diacetoxymercuri-2,5-diketopiperazine, with an aqueous solution of a hydrogen halide. Particularly good results are obtained using hydrogen chloride or hydrogen bromide. The Journal of Organic Chemistry reference referred to above also illustrates this method of preparation.

The fungicidal activity of certain N,N'-disubstituted-2,5-diketopiperazines were determined by the following tests:

TEST 1

Tomato plants are sprayed with an aqueous dispersion of the diketopiperazine. After drying, the treated plants are spray-inoculated with a mixed sporangial and zoospore suspension of Phytopthora infestans (late blight of tomatoes) and placed in an incubation chamber maintained at 70° F and at least 95 percent relative humidity. After 40 hours in the chamber, the plants are removed and inspected for lesions. The effectiveness of the treatment is determined by direct comparison with similarly inoculated controls. For example, if the extent of the lesions on the treated plants is 90 percent less than on the controls, an effectiveness rating of 90 is assigned.

TEST 2

The procedure of Test 1 is followed except the plants are spray-inoculated with an aqueous cell suspension of *Xanthomonas vesicatoria* (bacterial leaf spot of tomatoes).

TEST 3

Rice plants are sprayed with an aqueous dispersion of the diketopiperazine. After drying, the treated plants are spray-inoculated with an aqueous spore suspension of *Piricularia oryzae* (rice blast disease) and placed in an incubation chamber maintained at 70° F and at least 95 percent relative humidity. After a brief period in the chamber, the plants are removed to a greenhouse and after 5 days are inspected for lesions. The effectiveness of the treatment is determined by direct comparison of the number of lesions appearing on the treated plants and on untreated controls.

TEST 4

Cucumber plants are sprayed with an aqueous dispersion of the diketopiperazine. After drying, the treated plants are dusted with spores from cucumber plants infected with *Erysiphe cichoracearum* (powdery mildew of cucumbers). After receiving this spore shower, the treated plants are surrounded by the diseased plants and left undisturbed for 10 days. The effectiveness of the treatment is determined by direct comparison with untreated controls after the 10 day period.

The results of these tests are tabulated below:

| N,N' Substituent | Conc. (ppm) | Effectiveness Test 1 | Test 2 | Test 3 | Test 4 |
|---|---|---|---|---|---|
| Cl | 1,000 | 99 | 87 | NT | NT |
| Br | 1,000 | 99 | NT | 83 | 70 |
| —HgOCOCH$_3$ | 100 | 98 | 63 | 100 | NT |
| —HgOCOCF$_3$ | 250 | 99 | 95 | 94 | NT |
| —HgCl | 500 | 99 | 99 | 97 | NT |

NT = Not tested

The mercury-containing compounds tested above would normally not be used as foliar fungicides because of the toxicity of mercury. The tests serve only to demonstrate the fungicidal activity of the compounds. Practical use of the mercury-containing compounds would be limited to nonfoliar applications, such as seed or soil treatment, or nonagricultural uses.

The nematocidal activity of certain N,N'-disubstituted-2,5-diketopiperazines was determined by spraying *Panagrelli redivivi* (sour mash nematodes) with an aqueous dispersion of the diketopiperazine and, with the aid of a microscope, observing the percent killed three days after treatment. The results are tabulated below:

| N,N' Substituent | Concentration (ppm) | Percent Killed |
|---|---|---|
| Cl | 125 | 100 |
| Br | 125 | 100 |
| —HgOCOCH$_3$ | 25 | 100 |
| —HgOCOCF$_3$ | 31.25 | 100 |
| —HgCl | 62.5 | 100 |

The compound N,N'-dichloro-2,5-diketopiperazine was prepared in accordance with the method of Example 1 of U.S. Pat. No. 3,142,530. The compound N,N'-dibromo-2,5-diketopiperazine was prepared as described in Example 1 below. Example 2 below describes the preparation of N,N'-di(trifluoroacetoxymercuri)-2,5-diketopiperazine. The other mercury-containing diketopiperazines employed in the tests were prepared in accordance with the experimental methods described in the Journal of Organic Chemistry reference previously mentioned herein.

EXAMPLE 1

Preparation of N,N'-dibromo-2,5-diketopiperazine

To a solution of 23.32 grams of sodium carbonate in 850 ml of water was added 22.8 grams of 2,5-diketopiperazine. The mixture was stirred at 15°–25° C as 64 grams of bromine were added dropwise. After the reaction mixture had been stirred for 2 hours at 15°–25° C, the cream colored solid which had formed was recovered by filtration, washed with water, and dried under vacuum at 40° C. A total of 47.4 grams of product, identified by elemental analysis as N,N'-dibromo-2,5-diketopiperazine, were recovered.

EXAMPLE 2

A solution of 1.14 grams of 2,5-diketopiperazine in 36 ml of water was added dropwise to a refluxing mixture of 8.53 grams of mercuric trifluoroacetate, 25 ml of water, and 3 ml of trifluoroacetic acid. The resulting solution was allowed to reflux for 30 minutes and was then subjected to a vacuum at 40° to 50° C to evaporate the volatile components. The residue that remained weighed 6.95 grams, had a melting point of 135°–136° C, and was identified by elemental, infrared spectrum, and nuclear magnetic resonance analyses as N,N'-di(trifluoroacetoxymercuri)-2,5-diketopiperazine.

We claim:

1. A method of killing nematodes which comprises applying to the nematodes a nematocidally effective amount of an N,N'-dihalo-2,5-diketopiperazine wherein the halogen atoms attached to the nitrogen atoms are the same and are selected from the group consisting of fluorine, chlorine, bromine and iodine.

2. The method of claim 1 wherein the halogen atoms are chlorine or bromine.

* * * * *